June 10, 1958     A. L. SCHALDENBRAND     2,838,339
MOTOR VEHICLE BODY MOUNT
Filed May 20, 1955

A. L. SCHALDENBRAND
INVENTOR.

BY E. C. McRae
J. L. Faulkner
H. Oster

ATTORNEYS

United States Patent Office 2,838,339
Patented June 10, 1958

2,838,339

MOTOR VEHICLE BODY MOUNT

Arthur L. Schaldenbrand, Farmington, Mich., assignor to Ford Motor Company, Dearborn, Mich., a corporation of Delaware Application May 20, 1955, Serial No. 509,815

3 Claims. (Cl. 296—35)

This invention relates generally to resilient mounts for attaching a motor vehicle body to a motor vehicle frame.

It is customary to attach a motor vehicle body to the frame by a plurality of spaced body mounts incorporating resilient insulators to secure the body to the frame and to insulate the body against frame vibrations and noise. An object of the present invention is to provide a body mount of this type which can be initially assembled upon a frame part by a fastening means, and which subsequently can be secured to the motor vehicle body by means of additional fastening means adapted to engage the fastening means securing the mount to the frame part.

With this construction the body mounts can be preassembled to the vehicle frame prior to the assembly of the body thereto so that the mounts will automatically be in proper position for later attachment to the body. It is thus only necessary to make a simple connection to each body mount during the final assembly of the body to the frame, and problems relative to proper positioning of the body mounts and the alignment thereof with the frame and body are eliminated.

In an embodiment of the invention a pair of resilient insulators are positioned on opposite sides of a frame outrigger bracket and are clamped thereto by means of a pair of retaining washers engaging the outer sides of the insulators and suitable fastening means such as a bolt and nut. During this subassembly operation the mount is properly positioned with respect to the frame bracket and the resilient insulators are compressed and distorted in a predetermined manner for proper operation in the finished assembly. The bolt protrudes upwardly beyond the mount and is adapted to penetrate an aperture in the body when the latter is dropped upon the frame. A lock washer and nut complete the assembly of the body to the body mount.

In another modification of the invention, the resilient insulators are formed with large central apertures and the retaining members are in the form of peripherally flanged cup shaped members with the cups penetrating the apertures and insulators and abutting each other and suitably secured together by fastening means, thus clamping the insulators to the frame outrigger bracket. When the body is dropped upon the frame, a separate fastening means is used to connect the body to each of the body mounts carried by the frame.

Other objects and advantages of this invention will be made more apparent as this description proceeds, particularly when considered in connection with the accompanying drawings, wherein.

Figure 1:
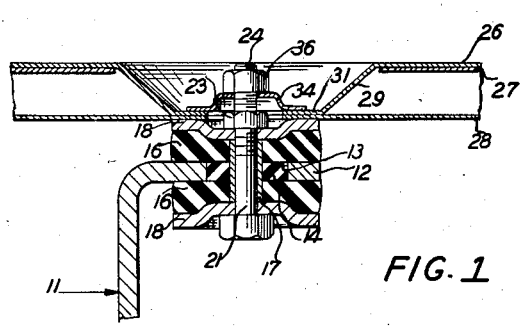
Figure 1 is a vertical cross sectional view through the body mount incorporating the present invention, as assembled to a frame part and a body part.
Figure 2:
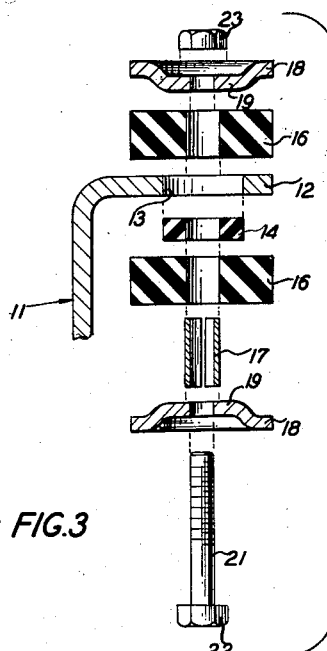
Figure 2 is an exploded cross sectional view of a portion of Figure 1, showing the parts of the body mount ready for attachment to the frame part to form a subassembly therewith.
Figure 3:
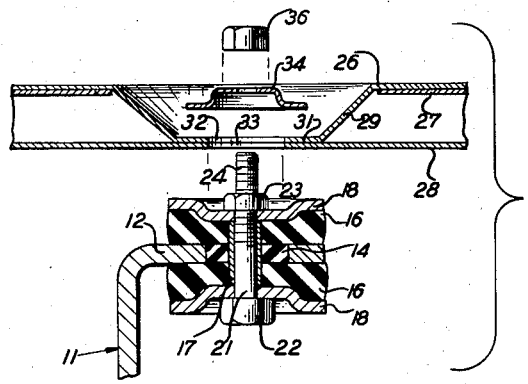
Figure 3 is an exploded cross sectional view of the construction shown in Figure 1, illustrating the parts shown in Figure 2 in assembled relationship with the frame part and ready for connection to the body part.

Referring now to the drawings, and particularly to the modification of the invention shown in Figures 1 to 3 inclusive, the reference character 11 indicates a frame outrigger bracket carried by and extending laterally outwardly from a vehicle frame (not shown) in the conventional manner. The outrigger bracket 11 has a horizontal flange 12 formed with an aperture 13 therein. With particular reference to Figure 2, a centrally apertured rubber spacer 14 fits into the aperture 13 in the supporting flange 12 of the outrigger bracket, and a pair of apertured rubber insulators 16 are positioned in alignment therewith on opposite sides of the flange 12 of the bracket. The insulators 16 are initially of cylindrical form in their free positions, but it will be noted later that they are practically compressed and distorted when finally assembled to the frame bracket.

A split sleeve 17 is inserted through the aligned apertures in the spacer 14 and the insulators 16, and a pair of dished apertured retaining washers 18 are positioned adjacent the outer sides of the resilient insulators 16, with their dished or offset central portions 19 in juxtaposition to the insulators 16. A bolt 21 is inserted through the parts thus assembled, with its head 22 adjacent the lower retaining washer 18. A lock nut 23 is threaded upon the upper end of the bolt 21 against the upper retaining washer 18 until the retaining washers have been drawn together into engagement with the opposite ends of the sleeve 17. The lower portion of Figure 3 illustrates the subassembly of the body mount parts with the outrigger bracket, and it will be noted that in this assembled position the rubber insulators 16 have been compressed by the retaining washers 18 and are somewhat distorted. It will also be noted that the upper end 24 of the bolt 21 extends a substantial distance above the upper retaining washer 18.

During the manufacture of the vehicle, a body mount of the type described above is assembled upon each of the frame outrigger brackets prior to the dropping of the vehicle body upon the frame. The body conventionally has an underbody assembly comprising a floor panel 26, a flange reinforcement 27 adjacent the lower surface of the floor panel, and a reinforcing panel 28. The floor panel 26 is formed with a depressed portion 29 adjacent each body mount and each depression has a base 31 formed with a central aperture 32. The reinforcing panel 28 is secured to the base 31 of the depressed portion of the floor panel and is likewise formed with a central aperture 33 in alignment with the aperture 32 in the floor panel.

The vehicle body is dropped upon the frame until the underbody assembly rests upon the upper retaining washers 18 of the body mounts, with the upper ends 24 of the bolts 21 and with the lock nuts 23 projecting through the aligned apertures 32 and 33 in the floor panel and reinforcing panel respectively of the underbody assembly. A dished lock washer 34 of spring steel is sleeved upon the threaded upper end 24 of the bolt 21, and the assembly is completed by means of a hex nut 36 clamping the underbody assembly to the body mount.

The openings 32 and 33 in the underbody assembly are sufficiently large to accommodate slight misalignments between the various body mounts and the body, and it will be seen that with the mounts preassembled to the frame outrigger brackets the final assembly of the body to the frame is greatly simplified.

Figures 4, 5:
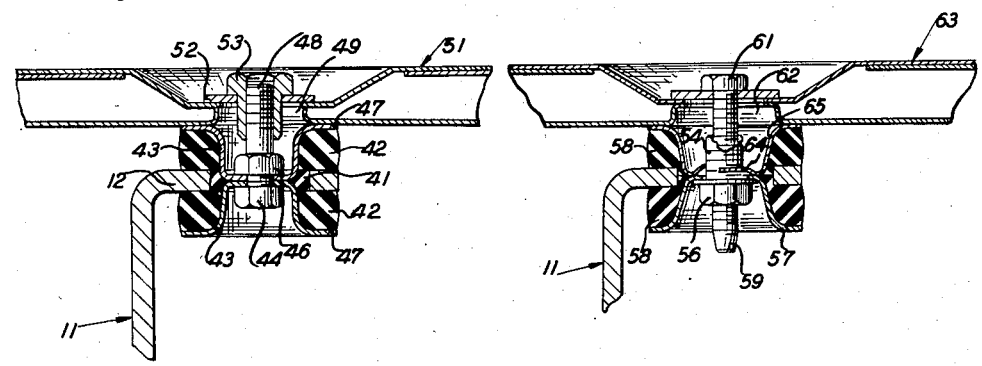
Figure 4 is a cross sectional view similar to Figure 1 but showing a modification of the invention.
Figure 5 is another cross sectional view showing a second modification.

Figure 4 illustrates a modification of the invention. In this construction a rubber spacer 41 and a pair of rubber insulators 42 are assembled to the frame outrigger bracket 11 by means of a pair of retaining members 43 and a bolt 44 and nut 46 in a manner somewhat similar to Figures 1 to 3 inclusive. The spacer 41 and insulators 42, however, are formed with enlarged aligned holes therethrough to accommodate the central portions of the retaining members 43. The retaining members 43 are generally cup shaped and extend into the apertures in the rubber insulators 42, and are arranged oppositely to each other with their base portions abutting in the zone of the central spacer 41. Each of the cup shaped retaining members 43 is formed with a peripheral flange 47 engaging the outer sides of the insulators 42 to enable them to be compressed and clamped to the flange 12 of the outrigger bracket 11 when the nut 46 has been tightened upon the bolt 44.

As in the first modification, the threaded upper end 48 of the bolt 44 extends upwardly beyond the upper retaining member 47 and projects through an opening 49 in the vehicle underbody assembly 51. A lock washer 52 and nut 53 complete the assembly of the underbody 51 to the mount.

The modification shown in Figure 5 is similar to that in Figure 4 except that the base flange 64 of the upper cup shaped retaining member 65 is formed with sheet metal threads adapted to threadedly receive the shank 54 of a hollow bolt 56. The bolt 56 thus clamps the upper retaining member 65 and the lower retaining member 57 together to clamp the rubber insulators 58 to the frame outrigger bracket 11. The hollow bolt 56 is internally threaded to receive the threaded shank 59 of a bolt 61 extending through an opening 62 in the vehicle underbody assembly 63 to clamp the body to the body mount carried by the frame outrigger bracket 11.

It will be understood that the invention is not to be limited to the exact construction shown and described, but that various changes and modifications may be made without departing from the spirit and scope of the invention, as defined in the appended claims.

What is claimed is:

1. A body mount for connecting a motor vehicle body part to an apertured motor vehicle frame part, comprising a pair of apertured resilient insulators positioned on opposite sides of said frame part and with the frame part in contact only with said resilient insulators, a pair of cup shaped retaining members oppositely disposed with respect to each other and extending into the apertures in said insulators and positioned with their bases abutting each other, said retaining members having peripheral flanges embracing the outer sides of said insulators, fastening means securing said retaining members together, and additional fastening means engageable with said first mentioned fastening means and securing said body part to said frame part through said resilient insulators.

2. The structure defined by claim 1 which is further characterized in that said first mentioned fastening means comprises a hollow internally and externally threaded bolt extending through an aperture in the base of one of said retaining members and externally threadedly engaging the base of the other of said retaining members, and said second mentioned fastening means comprises a bolt engageable with said body part and threadedly engaging said internally threaded bolt.

3. A body mount for connecting a motor vehicle body part to an apertured motor vehicle frame part, comprising a pair of apertured resilient insulators positioned on opposite sides of said frame part, a pair of retaining members adjacent the outer sides of said insulators and having offset central portions extending into the apertures in said insulators, and abutting each other, means associated with the offset central portions of said retaining members and securing said retaining members to each other and clamping said insulators to said frame part to form an assembly thereon, and fastening means engageable with said means and securing said body part to said frame part through said resilient insulators.

References Cited in the file of this patent

UNITED STATES PATENTS

| 1,871,963 | Dill | Aug. 16, 1932 |
| 2,144,170 | Utz | Jan. 17, 1939 |
| 2,323,571 | Schroeder | July 6, 1943 |

FOREIGN PATENTS

| 755,771 | France | Nov. 3, 1933 |
| 626,809 | Great Britain | July 21, 1949 |